(12) United States Patent
Mcnally

(10) Patent No.: US 11,920,830 B1
(45) Date of Patent: Mar. 5, 2024

(54) TOOL AND METHOD FOR CLEANING AND DRAINING A WATER HEATER

(71) Applicant: Russell Dwayne Mcnally, Boise, ID (US)

(72) Inventor: Russell Dwayne Mcnally, Boise, ID (US)

( * ) Notice: Subject to any disclaimer, the term of this patent is extended or adjusted under 35 U.S.C. 154(b) by 0 days.

(21) Appl. No.: 17/985,801

(22) Filed: Nov. 11, 2022

(51) Int. Cl.
| | |
|---|---|
| *F24H 9/00* | (2022.01) |
| *B08B 9/08* | (2006.01) |
| *F04F 10/00* | (2006.01) |
| *F16L 43/02* | (2006.01) |
| *F24H 9/16* | (2022.01) |
| *B01D 21/00* | (2006.01) |
| *F16L 15/00* | (2006.01) |

(52) U.S. Cl.
CPC ............ *F24H 9/0042* (2013.01); *B08B 9/08* (2013.01); *F04F 10/00* (2013.01); *F16L 43/02* (2013.01); *F24H 9/16* (2013.01); *B01D 21/0006* (2013.01); *F16L 15/00* (2013.01)

(58) Field of Classification Search
CPC .................................. F24H 9/0042; F24H 9/16
See application file for complete search history.

(56) References Cited

U.S. PATENT DOCUMENTS

| | | |
|---|---|---|
| 1,527,135 A | 2/1925 | Hepburn et al. |
| 1,826,829 A | 10/1931 | Scott |
| 4,610,784 A | 9/1986 | Reyniers |
| 5,695,654 A | 12/1997 | Schultz |
| 6,517,320 B1 | 2/2003 | Reynolds |
| 6,547,532 B2 | 4/2003 | Gonzales et al. |
| 7,214,314 B2 | 5/2007 | Reyniers |
| 10,267,536 B1 | 4/2019 | Templin |

FOREIGN PATENT DOCUMENTS

GB 2337794 A * 12/1999 ................ F04F 1/00

OTHER PUBLICATIONS

Draining an Old Clogged Water Heater (Year: 2012).*
How to flush water heater to remove sediment (Year: 2020).*
How to remove water from a tank water heater with clogged drain (Year: 2019).*

(Continued)

*Primary Examiner* — Steven S Anderson, II
*Assistant Examiner* — Kurt J Wolford
(74) *Attorney, Agent, or Firm* — Pedersen & Company, PLLC; Ken J. Pedersen; Barbara S. Pedersen

(57) ABSTRACT

A tool and method clean and drain a water heater tank, removing water and sediment from the tank. An insert tube fits through the hot water outlet port to reach the bottom of the tank interior. A fitting connects the insert tube to a hose extending down the outside of the tank to the floor/ground to a drain or container that is lower than the bottom of the tank interior. After priming the tool by using the cold water inlet flow to fill the tool with water and sediment, the cold water inlet is disconnected from the water heater, venting the tank so that water and sediment are siphoned out of the tank through the tool to empty the tank. The tool and method work without unplugging or disconnecting a clogged water heater drain line, without using a compressor or pump, and without creating a wet, messy environment.

12 Claims, 9 Drawing Sheets

(56) References Cited

OTHER PUBLICATIONS

My Water Heater Won't Drain [Fix It With 3 Easy Steps] (Year: 2019).*
Siphoning an 80 gallon water heater from a 3rd floor apartment (Year: 2020).*
Screen print of commercial product, GROZ Plastic Lever Action Drum Pump, Dec. 30, 2020.
Screen print of commercial product, TERAPUMP TRTI901 BPA-Free Extra Heavy Duty Siphon Drum Pump, Dec. 30, 2020.

* cited by examiner

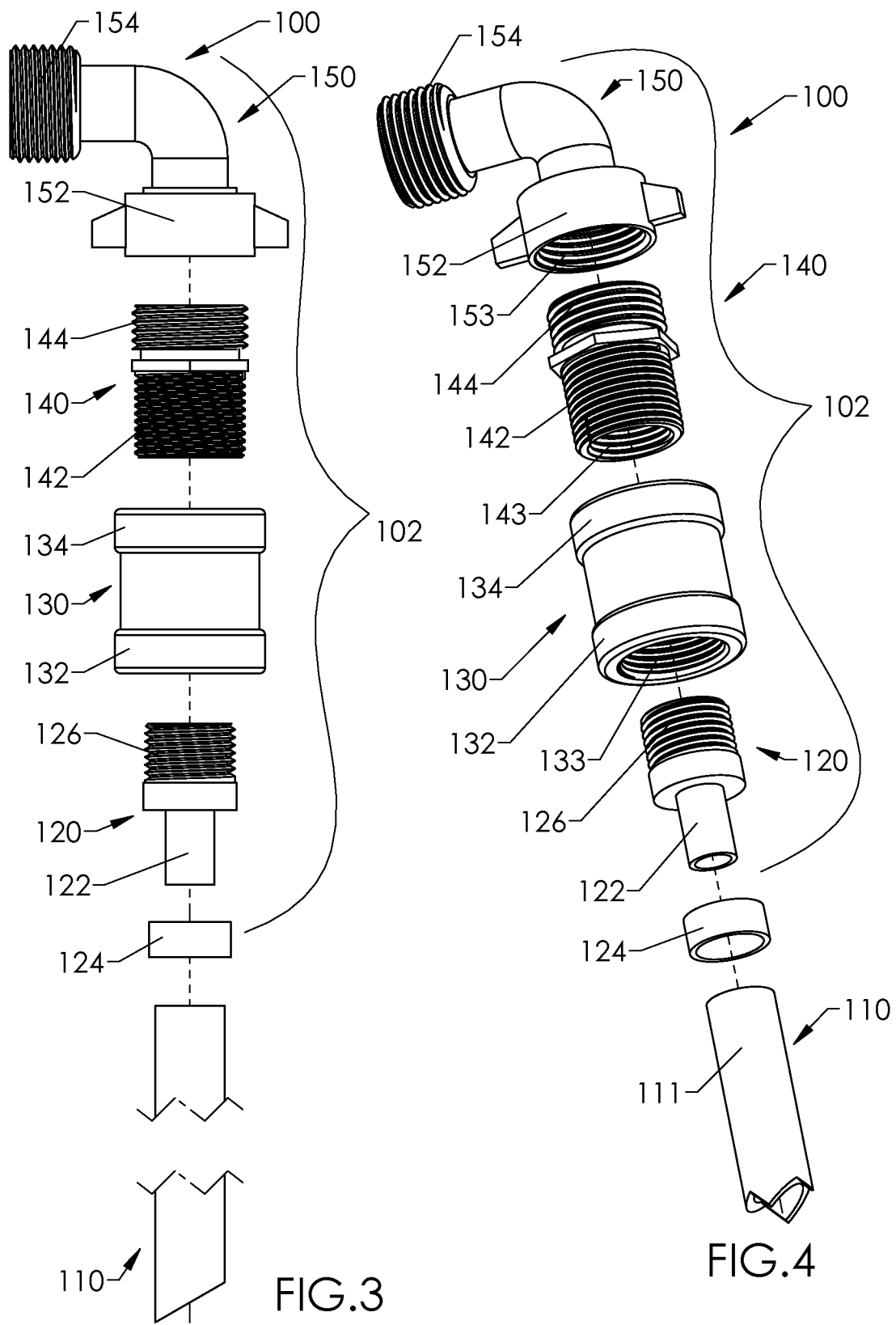

TOOL AND METHOD FOR CLEANING AND DRAINING A WATER HEATER

BACKGROUND OF THE DISCLOSED TECHNOLOGY

Field of the Disclosed Technology

The invention relates to methods of draining a hot water heater for cleaning, repair, or replacement, and, more specifically, to methods of draining a water heater that has a bed of sediment in the water tank of the heater.

Related Art

Water heaters for home and commercial use are prone to become inefficient or inoperable due to, for example, the buildup of sediment in the water heater tank. This sediment typically results from natural minerals that flow into the water heater in the cold water supply, and when the water is heated, the minerals are deposited at the bottom of heater's tank. The sediment may comprise or consist of calcium carbonate. The sediment can lead, for example, to reduced efficiency of heat transfer for heating, and/or corrosion of the interior surfaces of the water heater, which can lead to unhealthy chemicals being released into the heated water. In some cases, the sediment and/or internal corrosion may become serious enough that the water heater or its pressure relief valve fails and/or leaking or flooding occurs.

To avoid or solve the problems caused by sediment, conventional instructions recommend flushing the hot water heater by opening the provided drain valve in the drain line at the bottom of the heater tank. However, this conventional method often does not work, because, in addition to forming as a bed at the bottom of the tank, the sediment often blocks the drain line and/or drain valve at the bottom of the tank, making flushing of water and sediment out of the tank is difficult or impossible. The home or commercial property owner is then faced with calling a plumber to clean out the water heater tank or replace the water heater. Said cleaning out of the water heater, or draining the water heater in order to disconnect it and haul it away, typically results in the plumber having to disassemble the drain line and/or use a pump to try to pull draining from the drain line and/or a to connect a compressor to the drain line to try to force air into the drain line to clear the drain line/valve, which steps are all time-consuming, ineffective, and/or usually create a water and sediment mess. These scenarios may occur with most or all water heaters, for example, electrical- or gas-heated water heaters of various sizes and brands. The present invention provides improved tools and methods of draining a water heater for cleaning, repairing or replacing that clay be used easily and efficiently by water heater owner or a plumber.

SUMMARY

The invention comprises a tool and/or method for cleaning or "flushing" and/or draining the water tank of a water heater. The tool and/or method are used to remove sediment from the interior of the water heater tank, especially in cases wherein sediment buildup has reached a point wherein draining through the heater tank's conventional drain valve and line is not effective. The tool comprises an elongated insert tube adapted to fit through a water-port at or near the top of the water heater and to reach to at or near the bottom of the tank. The insert tube upper end is connected to a hose or other down-spout member that is adapted to extend from the insert tube and down a side of the water heater tank to the floor or ground, preferably to a container or a drain. The invented method comprises steps whereby sediment and water from the bottom of the tank rise through the insert tube and out to the floor/ground. Additional step(s) cause the entire or substantially the entire sediment bed and tank of water to be subsequently emptied through the tool to the floor/ground.

Certain embodiments of the invented tool and method comprise removing the hot water outlet line from the hot water port and connecting the tool to the hot water port so that the tool is air- and liquid-sealed sealed to the hot water port and so that the insert tube extends to at or near the bottom interior of the tank. The method then comprises turning on the cold water to the water tank to prime the tool. This priming comprises the cold water supply pressure forcing sediment and water, which is at and around the bottom end of the insert tube, to flow up into and through the insert tube and to and through the hose or other down-spout to a drain or drain-container. The cold water supply and corresponding pressure may be from a conventional source, for example, from a municipal water system, a well- and pump-provided water system, or other residential or commercial water systems. Given the incoming cold water supply pressure and the drain or drain-container being at a level below the water tank, this flow up and through the insert tube and down through the hose/down-spout to the drain/container may continue indefinitely, with the incoming cold water replacing the liquid leaving the tank. This will could clean out some or much of the sediment from the tank bottom, but would leave the tank full of water and water/sediment slurry.

In certain embodiments, it is desired to clean out the sediment and also drain the tank, for more thorough cleaning by ensuring that very little sediment is left in the tank and/or to empty the tank of water so that the empty hot water heater may be disconnected and removed. In certain embodiments, therefore, the tool and methods comprise closing the cold water inlet after the tool is primed. This both stops cold water in-flow into the tank and creates an unvented system, as the liquid water and sediment continue to flow, through the tool and out to the container/drain below the water tank, long enough to create a vacuum in the unvented system. After the created vacuum is sufficient to counteract the siphoning action of the flow from the tool to the container/drain below the tank, the liquid flow stops, but the tank remains full of liquid (water and sediment) and the tool remains full of liquid (water and sediment). Then, in order to continue the flow of sediment and water out of the tank through the tool in a manner that can empty or substantially empty the tank of both sediment and water, a vent is opened to vent the tank to atmosphere. This venting is preferably done by disconnecting the cold water supply line from the cold water port to vent the top end of the tank to the atmosphere. With air now entering the tank, the flow of sediment and water from the tank, through the previously primed tool, resumes due to siphon-action created by the liquid-full tool and allowed to continue by the venting, and will continue until substantially all the sediment and water have been drained through and out from the tool. This empties and cleans the hot water tank effectively and thoroughly, typically removing all the liquid down to a fraction of an inch from the bottom floor of the tank. Removal of the liquid to this extent is done without having to try to unblock or disconnect the typically clogged/blocked and nonfunctional conventional water heater drain valve and/or drain line and without having to use a compressor or pump, and consequently also without creating a wet, messy environment.

BRIEF DESCRIPTION OF THE DRAWINGS

FIG. 3 is a schematic exploded side view of one embodiment of the invented tool for cleaning and emptying a hot water heater, wherein this embodiment in use would be connected at its top end to a down-spout, preferably a garden hose, to drain the contents of the water heater tank to the floor/ground or a container thereon.

FIG. 4 is a schematic exploded side perspective view of the tool of FIG. 3.

DETAILED DESCRIPTION OF CERTAIN EMBODIMENTS

Referring to the Figures, there are shown certain, but not the only, embodiments of the disclosed apparatus and methods. The preferred embodiments are effective and efficient for cleaning or "flushing" hot water heaters having tanks that contain sediment. Certain embodiments of the present invention allow for effective, efficient, and convenient, non-messy cleaning and draining of a water heater tank in which a sediment bed and drain-line-plugging have occurred. Such embodiments may eliminate the need to try to unplug, or disassemble the drain line/valve, and may effectively clean the hot water heater for further use or drain the hot water heater for easier removal and transport.

Figure 1:
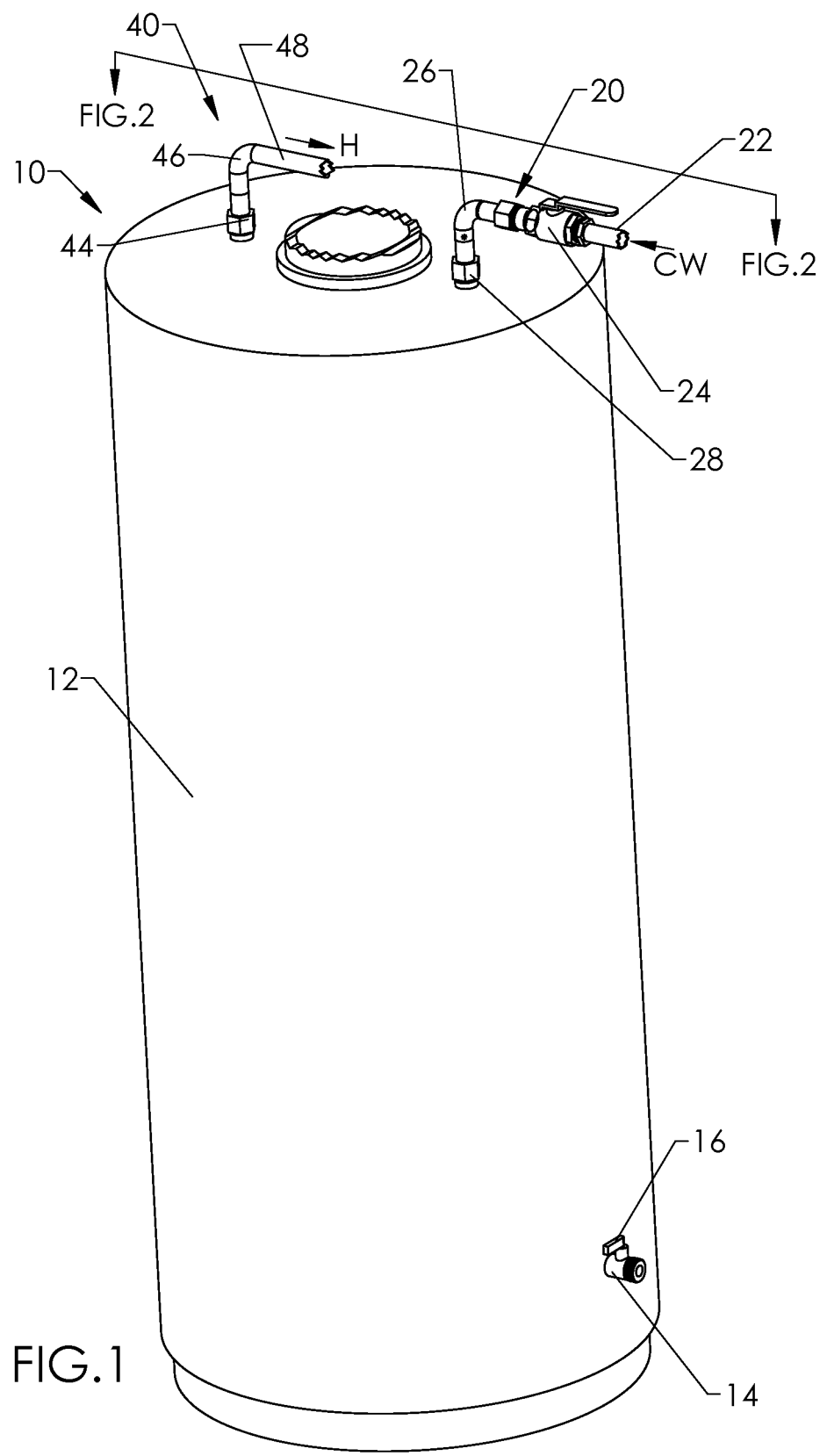
FIG. 1 is a schematic side perspective view of one embodiment of a conventional hot water heater that may be cleaned and emptied by the invented tool and methods.
Figure 2:
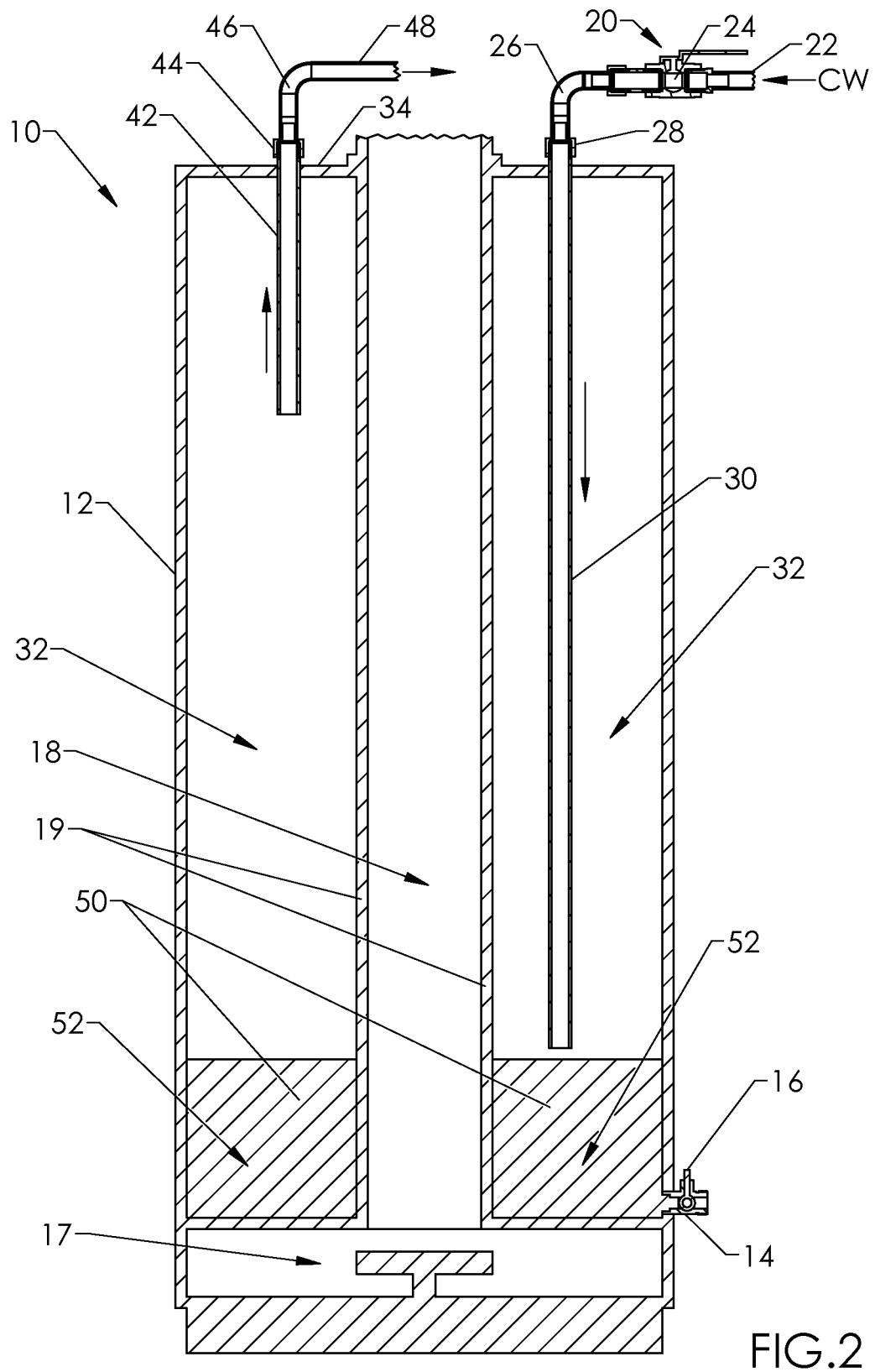
FIG. 2 is a schematic cross-sectional view of the hot water heater of FIG. 1, viewed along the line 2-2 in FIG. 1, showing cold water flowing into the tank and hot water exiting the tank according to the conventional function of the water heater, but wherein a sediment bed has built-up at the bottom of the tank interior and inside the drain line and drain valve at the bottom-right of the tank.

An exemplary conventional hot water heater 10 with water tank 12 and drain line 14 and valve 16 is shown in FIGS. 1 and 2. The water tank 12 may be of many different sizes, with common styles being cylindrical and greater in height than in diameter. This exemplary water heater 10 is gas-fired, as illustrated in FIG. 2, by the gas-flame chamber 17 and the flew/chimney 18 formed by chimney walls 19, but the tool and methods may be applied to other types of water heaters, such as electric. In each water heater, the gas, electricity, or other fuel should be shut off before the draining and cleaning methods proceed.

The cold water inlet 20 supplies cold water flow CW to the tank and comprises a supply pipe 22 that extends from the cold water source (not shown), through a valve 24 and fitting 26 that connects to the cold water port 28 and an incoming water in-tank pipe 30 in the tank interior space 32 that extends around the outside of flew/chimney 18, wherein the in-tank pipe 30 extends most of the way to the tank bottom. The hot water outlet 40 comprises an out-going hot water in-tank pipe 42 in the tank interior space 32 that connects to the hot water outlet port 44 that extends through, and upends from, from the top wall 34 of the tank 10, and a hot water fitting 46 connected at one end to the hot water port 44 and at the other end to a hot water supply pipe/hose 48 that extends to hot water taps and other uses in the building.

FIG. 2 illustrates a sediment bed 50 of calcium carbonate and/or other solids settled at the bottom end 52 of the tank interior space 32 on the bottom floor 55 of the interior space 32, wherein the sediment extends into the drain line 14 and against or into the internal components of the drain valve 16. It will be understood that the left and right interior regions of the water heater in the cross-sectional drawings herein, including left and right portions of the sediment bed 50 and of the floor 55, typically extend all around the flew/chimney 18 formed by the typically cylindrical flew/chimney wall 19, and so are connected and are parts of a single sediment bed and single floor. Similarly, it will be understood that the water in the left region and right region of the tank interior shown in the cross-sectional drawings is part of a single body of water which is all in fluid communication in tank interior space 32 around the flew/chimney 18.

Typically, when a plumber is called to clean such a water heater, the plumber finds that the drain line 14 and/or valve 16 are not operational, which it typically due to the substantial sediment bed 50 that has build-up over time at the bottom of the tank interior space 32, inside the drain line 14, and also against or inside the drain valve 16 components. The plumber is not able to drain and/or clean the tank 12 through the drain line, and the typical methods and tools for working-around a clogged drain line/valve are time-consuming and messy. One such work-around is removing the entire drain line 14 and inserting a tool to try to disrupt the sediment bed to an extent that allows sediment and water to drain out of the bottom drain hole (where the drain line 14 typically is connected to the tank), but this often creates a mess of sediment and water on the building floor and/or damage to the drain line 14 port.

Figure 5:
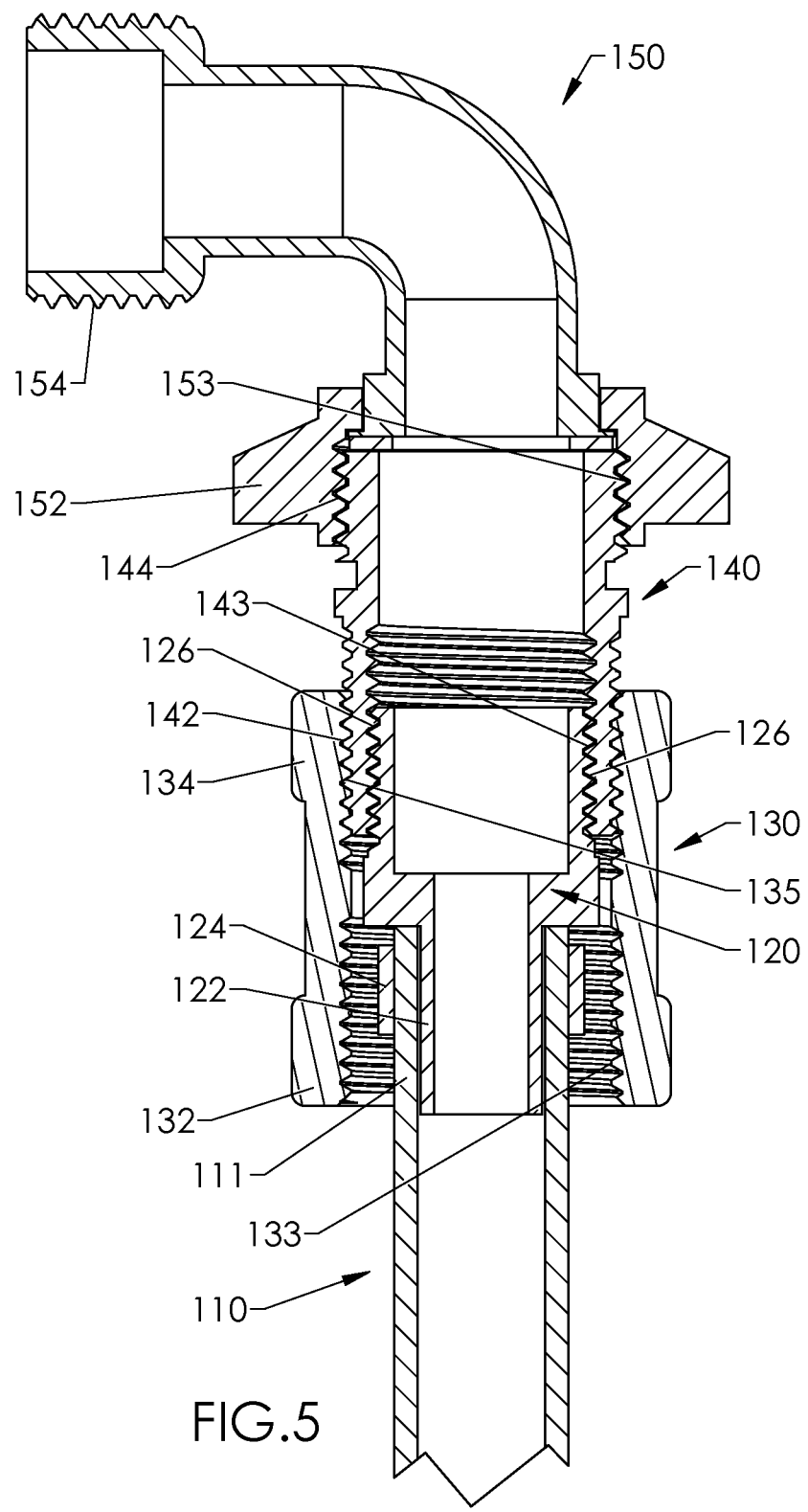
FIG. 5 is a schematic cross-sectional side view of the assembled tool of FIGS. 3 and 4.

FIGS. 3-5 show a tool portion 100 of one embodiment of the invented tool 200 (see FIGS. 7-10) for use in cleaning and draining a hot water heater 10 having a tank 12 prone to buildup of sediment 50. The tool portion 100 at its top outlet is connected to a garden hose to form tool 200. The tool portion 100 comprises a fitting system 102 having a bottom end that connects and seals to an insert tube, in this embodiment a plastic "dip-tube" 110, and having an opposite top end that connects and seals to a garden hose 160. Thus, the fitting system 102 extends between the bottom dip-tube 110 and the top garden hose 160, with both dip-tube and garden hose extending downward from the fitting system 102 to be vertical and parallel (or substantially vertical and parallel) and to carry water and sediment from at or near the bottom floor 55 of the water tank, up and out of the tank and down to a drain/drain-container.

Two important functions of the fitting system 102 are to mechanically connect and fluid seal the dip-tube 110 to the garden hose or other downspout, that is, to connect the upper end of the dip-tube 110 to the garden hose or other downspout in a way that establishes a fluid passageway all the way from the bottom opening of the dip-tube 110 to the bottom opening of the garden hose 160 or other downspout, in a way that prevents fluid (here, typically water or water-sediment slurry) from leaking out from the fitting system 102 or from the connections of the fitting system to the dip-tube 110 and the hose 160 or downspout. Another important function is to seal the dip-tube and hose/downspout to the tank interior space 32 to prevent fluid (here, typically water and water-sediment slurry) inside the interior space 32 from leaving the tank by bypassing said fluid passageway of the tool, and to prevent fluid (here, typically air) from entering the tank between the fitting system and the hot water port. This is preferably done by the fitting system 102 further comprising a mechanical connection and seal to the hot water port 44, as will be detailed below.

While specific components of the tool portion 100, fitting system 102, and tool 200 are described and detailed below, including preferred diameters and threading, a plumber or other person of skill in the art, upon reading this disclosure including the important functions discussed above, and viewing the drawings, will understand the components, diameters, and threading, and the reasons therefor, including creating the desired mechanical and fluid-seals and the resulting, operative fluid passageway through the tool 200 for draining and cleaning. In view of those details and said important functions, a plumber or other person of skill in the art will be able to make and use the tool including alternative embodiments still within the scope of the invention.

The dip-tube 110 is preferably rigid but cuttable to various lengths and cuttable to have a slanted or tapered bottom end 112 to create a slanted/tapered bottom opening, hereafter called a "slanted" tip or opening. For example, the dip-tube 110 may be cross-linked polyethylene, commonly abbreviated PEX, XPE or XLPE, which is a form of polyethylene with cross-links that may be cut by a PEX cutter or other cutting systems. The preferred dip-tube 110 is a 0.5 inch (nominal I.D.) ID PEX tube, and, as will be detailed further below, is inserted into the water tank to reach to the interior bottom surface the tank that is the bottom floor 55 above which the volume of water in the tank is held/supported. The term "reach to the interior bottom surface"means the bottom-most tip of the dip-tube 110 being within 1 inch of the bottom floor 55. In some embodiments, the bottom-most tip of the dip-tube 110 is even closer to the bottom floor 55, for example, within ½ inch or ¼ inch of the bottom floor or even touching the bottom floor.

The fitting system 102 comprises adapter 120, coupling 130, connector 140, and hose elbow 150, wherein the "first end" of each of these fitting system components denoted the bottom end, that is, the end closest to the dip-tube 110, and the "second end" of each of these fitting system components denotes the top end that is away from the dip-tube 110 and closest to the end of the garden hose/downspout attachment to the fitting system 102. The dip-tube 110 is connected to the first end (bottom end) of adapter 120, which is unthreaded, tubular end 122, having an outer diameter the same or close to the inner diameter of the dip-tube 110. The dip-tube 110 top-end 111 is pushed over the adapter tubular end 122 and secured to the end 122 by a crimp ring 124 crimped tightly on and around the dip-tube 110 top end 111, to compress, secure, and liquid-and-air-seal the dip-tube 110 top end 111 to the tubular end 122. The adapter 120, with dip-tube 110 attached, is sized to be capable of sliding into and through coupling 130 without attaching thereto, as will be described later in this document, so that the male threaded second end (top end) 126 of the adapter 120, connects to a first end (bottom end) of connector 140. Said first end of the connector 140 is internally-threaded 143 (½ inch FIPS, female iron pipe) to receive male threaded second end (top end) 126 of the adapter 120, and is also externally-threaded 142 (¾ inch MIPS—male iron pipe straight). Thus, the male threaded top end 126 of the adapter 120 threadably connects to the internal female threading 143 of the bottom end of the connector 140 to connect and air- and liquid-seal the adapter 120 to connector 140. The male threading 142 of the first end (bottom end) of connector 140 is connected to coupling 130, as will be discussed later in this document. Therefore, it may be noted that the connector 140 has three sets of threads, two sets of male threads being on the exterior of the two ends of the connector 140 and a third set of female thread being on the interior of one of the ends of the connector 140.

The second end (top end) external male threading 144 of the connector 140 is different from the exxternal male threading 142 of the first end (bottom end) of the connector 140, in that top external threading 144 is ¾ inch (nominal I.D.) garden hose external threading, for connection to the first end (bottom end) of a garden hose pivoting elbow 150. The elbow 150 female first end (bottom end) 152 with internal garden hose threads 153 connects to connector second end (top end) threading 144, and a male second end (top end) with external garden hose threading 154 for the connection to a garden hose 160 at the female end connector 162 (see FIG. 8).

Coupling 130 is adapted to connect and fluid-seal (air- and liquid-seal) the tool portion 100, and therefore the entire tool 200, to the hot water port 44, and therefore to interior space 32, of the water heater 10. Coupling 130 threadably connected at its first end (bottom end) via internal threads 133 (¾-inch FIPS, female iron pipe straight) to the cooperatively, externally threaded hot water port 44 (having ¾-inch MIPS, male iron pipe straight, threads) that extends from the top wall 34 of the water tank 12. Coupling 130 threadably connected at its second end (top end) via internal threads 135 (see FIG. 5) to external threading 142 of the first end (bottom end) of the connector 140. This way, the tool portion 100 is installed in the tank and sealed to the tank interior space 32, to hold the entire tool 200 in an appropriate, operable position. The adapter 120, dip-tube top end 111, and crimp ring 124 extend through the coupling 130 and do not attach-directly to the coupling 130 or to the hot water port 44, and preferably do not touch the coupling 130 or the port 44. Instead, adapter 120, dip-tube top end 111, and crimp ring 124 are connected to the port 44 indirectly by the coupling 130. Also, the dip-tube 110 is sized in diameter to slide down through the out-going hot water in-tank pipe 42.

The preferred fitting system 102 may alternatively be described as a tool/fitting that connects a rigid or substantially rigid tube to a downspout, wherein the tube is about the length of the hot water heater tank, and the downspout is longer than the length of the hot water heater tank. The tube is preferably rigid, polymeric, and cuttable, for easy length-sizing and bottom opening tapering, effective placement of the bottom end of the tube at or very near the bottom surface of the tank, and for economy. The downspout is preferably flexible so that it may extend generally horizontally out from the hot water port along the top wall of the water tank, and then bend to extend down to the drain/drain-container. The downspout is preferably a garden hose for convenient connection, coiling for transport, and economy. Therefore, the preferred assembled tool 200 for many methods of this invention is an elongated tool that is much longer than it is in diameter, and that comprises a rigid, cuttable polymeric tube 110 at one end and a garden hose 160 on the other end.

In a currently preferred embodiment, the components of the tool portion 100 and its fitting system 102 and tool portion 100 may be described as follows, wherein a plumber or other person of skill in the art of pipe sizing and threading will understand the normal pipe sizes and nominal threading sizes and will be able to select components from this disclosure, the drawings, and the following details:

a) hollow dip-tube 110, ½-inch (nominal) plastic tubing having 15/32-inch inner diameter (I.D.) and ¾-inch outer diameter (O.D.);
  b) ½-inch (nominal) crimp ring 124 having 15/32-inch I.D. and ¾-inch O.D;
  c) hollow adapter 120 formed from a ½-inch (nominal I.D. of the internal passageway) pipe, the adapter being 1.5 inches long, having a tubular, non-threaded end that is machined from the ½inch (nominal) pipe to have 0.475 O.D. and a 2/32 inch wall thickness, which is a smaller O.D. than the original ½ inch (nominal) pipe (in order to receive and seal to the dip-tube 110, and having an opposing end that is ½ inch MIPS (male pipe thread straight) external threading of the ½ (nominal) pipe, wherein a portion of the original pipe remains between the two adapter ends that is a shoulder 0.860 inches in O.D. (the typical outer diameter of a ½ inch (nominal) pipe), and wherein the entire adapter 120 will fit into and slide longitudinally through a coupling 130 as described below;
  d) a hollow connector 140 that is a ¾-inch (nominal I.D. of the internal passageway), that comprises both external and interior threads, preferably 3 sets of threads that are ¾ inch MIPS external threads on a first ends as well as ½-inch FIPS (female iron pipe straight) interior threads in the first end, and ¾ inch garden hose threads (also "HB" or "hose bib" threads) on the opposite, second end, wherein the FIPS interior threaded first end of the connector receives and connects and seals to the externally-threaded ½ inch (nominal) end of the adapter 120, and the ¾ inch MIPS external threads of that same first end of the connector connects and seals to a coupling, described below, and wherein the ¾ inch garden hose external threading of the second end of the connector connects and seals to an elbow with conventional garden hose threading, described below;
  e) a hollow hose elbow having conventional hose-bib garden hose threading on both ends, the first end being a female end that connects to and seals to said second end of the connector 140, and a second end being a male end that connects to a conventional garden hose; and
  f) a coupling 130 is ¾-inch (nominal I.D.) with ¾ inch FIPS internal threading, wherein a first end of the coupling 130 receives and connects and seals to the hot water port that comprises a ¾-inch (nominal I.D.) pipe or "nipple" and that protrudes upward from the top surface of the tank, and the opposing second end of the coupling receives and connects and seals to the ¾ inch MIPS external threads of said first end of the connector 140, thus connecting the connector 140 to the hot water port. As detailed above, the coupling 130 is attached directly to the hot water port and attached directly to the connector 140, whereby the dip-tube 110, adapter 120, elbow 150 and garden hose 160 are indirectly connected to the hot water port.

Figure 6:
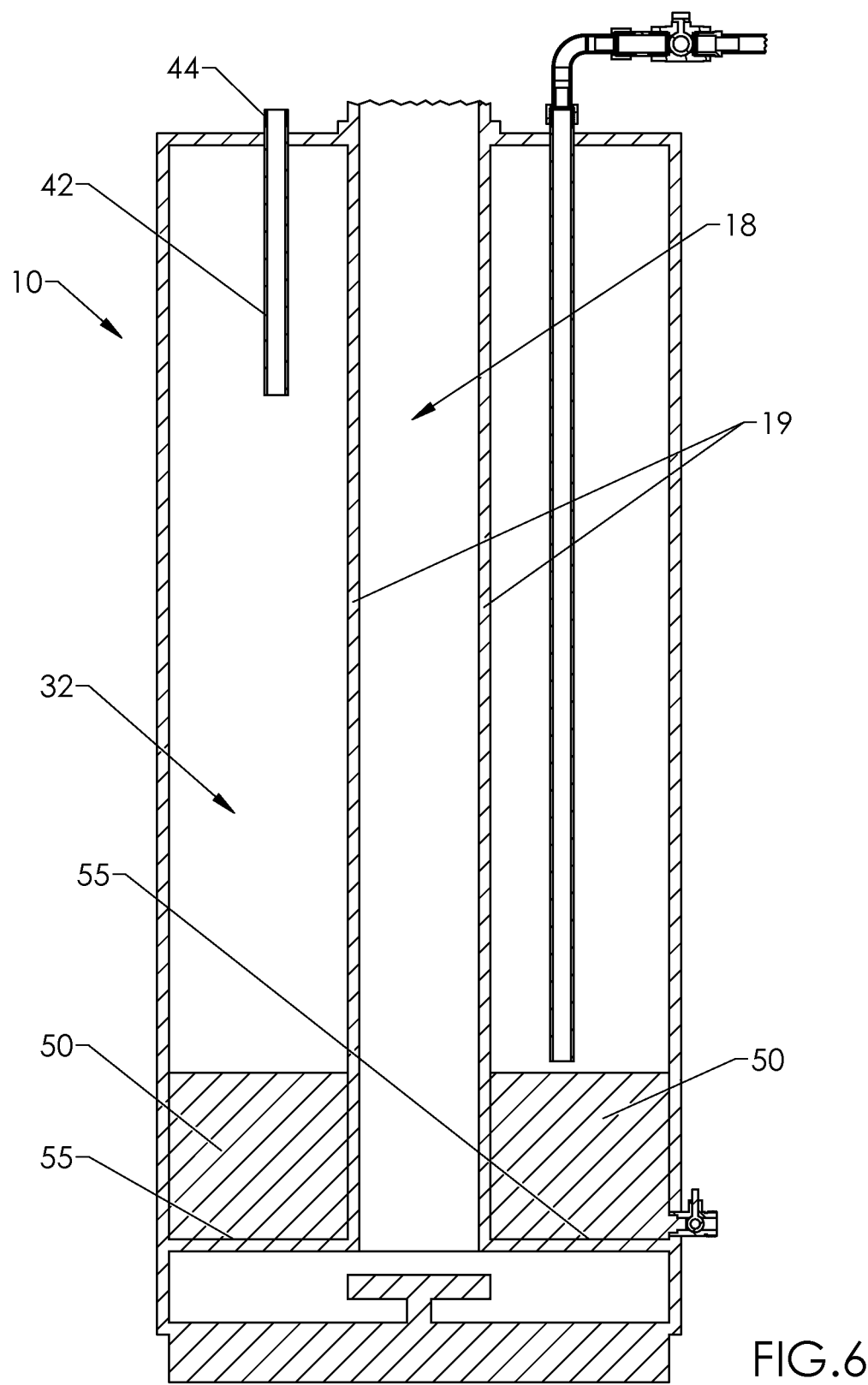
FIG. 6 is a schematic cross-sectional view of the hot water heater of FIGS. 1 and 2, with the hot water line disconnected and removed from the hot water port at the top left of the view in an early step of preparing for tool installation into the tank.
Figure 7:
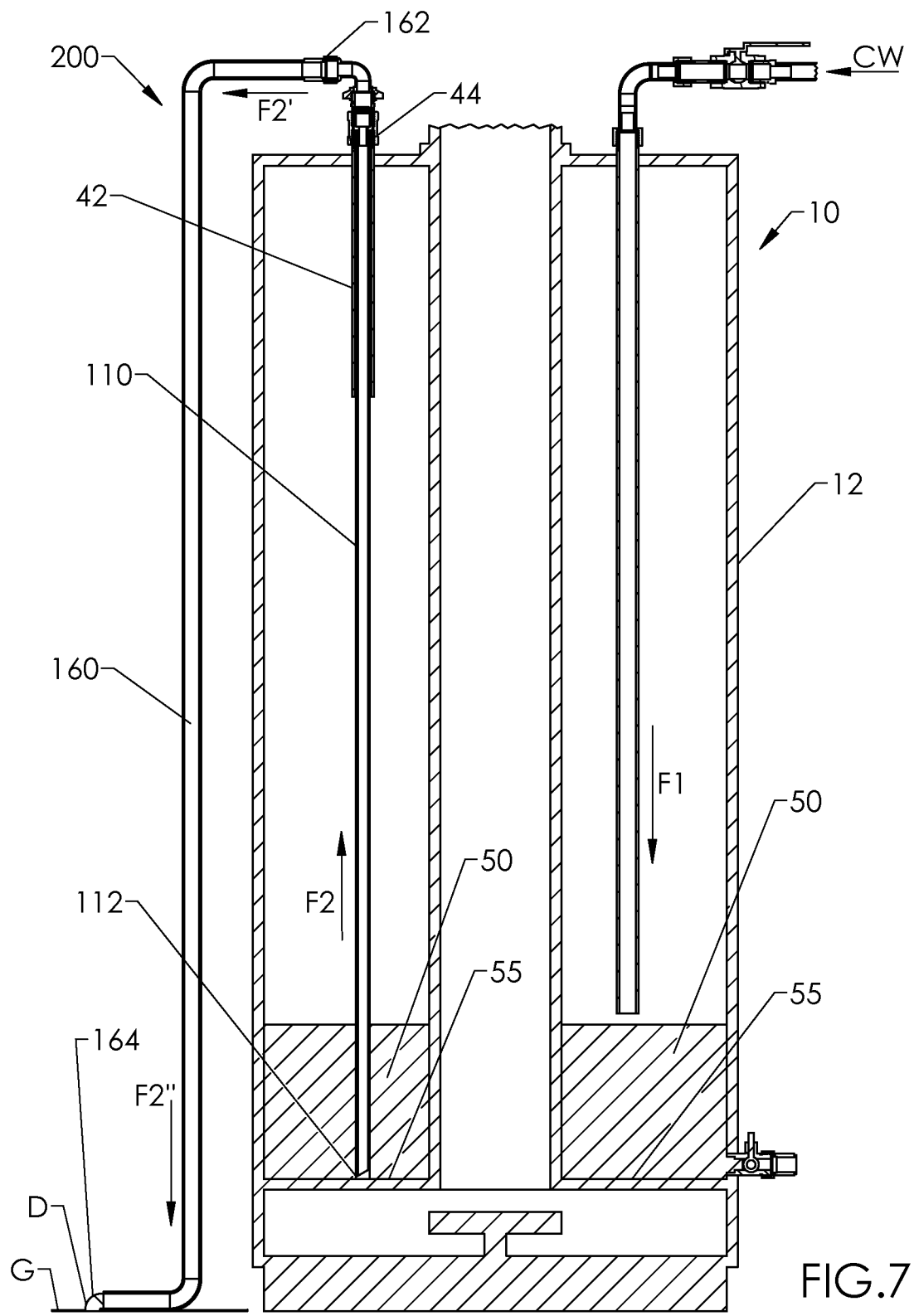
FIG. 7 is a schematic cross-sectional view of the hot water heater of FIG. 6 and an embodiment of the invented tool installed in the hot water port of the tank, and in use during an early method step to prime the tool, wherein the tool comprises the tool portion shown in FIGS. 3-5 and a garden hose connected to the tool portion to serve as the downspout.

Certain Embodiments of the Tool and Methods of Use with a Water Heater:

FIG. 6 illustrates the hot water heater 10 wherein the hot water fitting 46 and the hot water pipe/hose 48 have been disconnected from the hot water port 44 and in-tank pipe 42, and the cold water valve 26 has been closed. FIG. 7 illustrates the tool 200 installed in the tank 10 for use, with the dip-tube 110 inserted through the hot water port 46 and in-tank pipe 42, so that the bottom tip 112 of the dip-tube 110 extends through the sediment bed 50 to the bottom surface of the tank. The tip 112 is slanted/oblique relative to the longitudinal axis of the dip-tube 110, that is, preferably at about 45 degrees to the longitudinal axis.

In preparation for installing the tool 200 as shown in FIG. 7, the dip-tube 110 is inserted into the tank through the port 44 and pipe 42 to an extent that the bottom end hits the bottom surface 55. To start with, the dip-tube 110 may be 5 feet, for example, as that will typically be long enough to reach the bottom of most or all conventional water heaters. The user measures/marks and cuts the appropriate length of the dip-tube that will allow the tube 110 of the assembled tool 200 to be secured properly to the fitting system 102, with the bottom tip 112 hitting the bottom surface 55, when the coupling end 132 is threadably connected and sealed by internal threads 133 to the threads of the hot water port 44 external threads. The user makes the cut(s) according to this measurement and so that the top end of the dip-tube 110 is preferably perpendicular to the longitudinal axis of the dip-tube 110 and the bottom tip 112 is slanted to allow water and sediment to enter the bottom end opening of the tube 110 even when the tip is touching the bottom surface.

Figure 8:
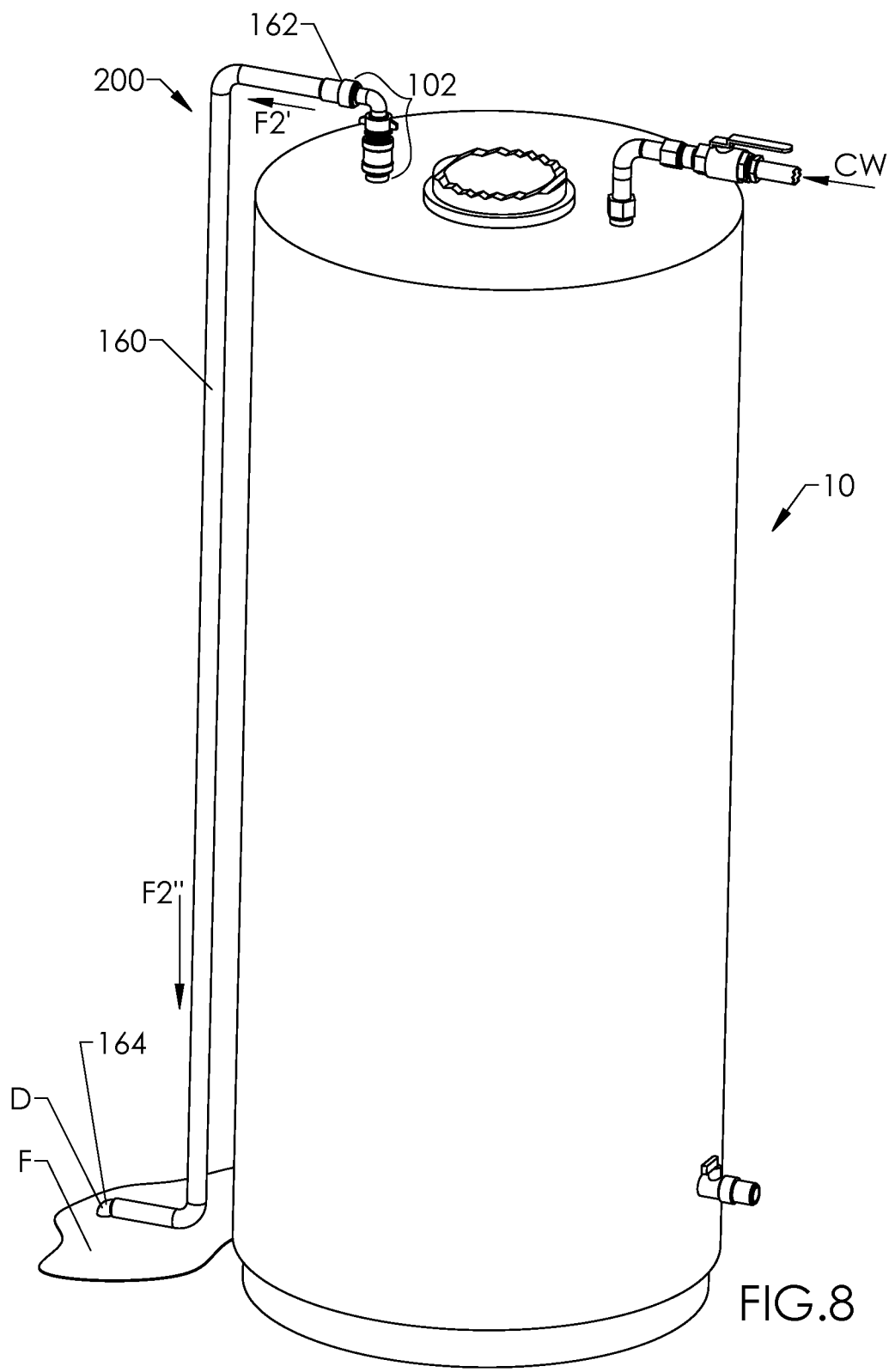
FIG. 8 is a schematic side perspective view of the hot water heater and tool of FIG. 7 in use in the method step of FIG. 7.

In FIGS. 7 and 8, with the tool 200 installed in place, the cold water CW is turned on by opening valve 24, so that cold water flows F1 into the tank 32. The cold water pressure/flow F1, which is typically at house or office water-pressure levels, for example, in the range of 40-60 psi, loosens the sediment and forces water and sediment flow into the bottom tip 112 opening of the dip-tube 110 and up through the dip-tube 110 (flow F2), through the fitting system 102 (flow F2'), into the garden hose fitting 162 and down through the garden hose 160 (flow F2") to the hose open end 164 at the ground/floor G, preferably to drain into a floor drain D or into a container (not shown) at or on the ground/floor G. FIG. 8 is a side perspective view of the hot water heater 10 during this procedure, illustrating the clean and non-messy process, wherein no leaking or flooding is experienced from any portion of the tank, including no leaking or flooding from the closed but still assembled drain line and valve 14, 16.

In FIGS. 7 and 8, the tool, including the dip-tube 110, the fitting system 102, and the garden hose 160, are full of water and sediment that are flowing to the drain D. The user may continue the steps in FIGS. 7 and 8 for an extended period of time, and this should clean some of the sediment out of the tank 10, but, due to the incoming cold water and mixing of the water and sediment in the interior space 32, the tank will continue to stay full of water and at least some of the sediment. Therefore, in certain embodiments, it is desirable to stop filling the tank with water and to substantially or entirely empty the tank 10, that is, to substantially or entirely clean and drain the tank 10. Therefore, in certain embodiments, the inlet water is stopped, for example, by shutting the cold water valve 24. By shutting the cold water valve, cold water flow F1 stops, but the water and sediment flow through the tool 200 to the drain D continues a short time until a vacuum is created inside the tank 12, as there is no venting of the tank. In other words, after the cold water inlet 20 is shut and after a small amount of continued flow F2, F2', F2", the tank internal pressure is reduced to a vacuum and the flow F2, F2', F2" stops.

Figure 9:
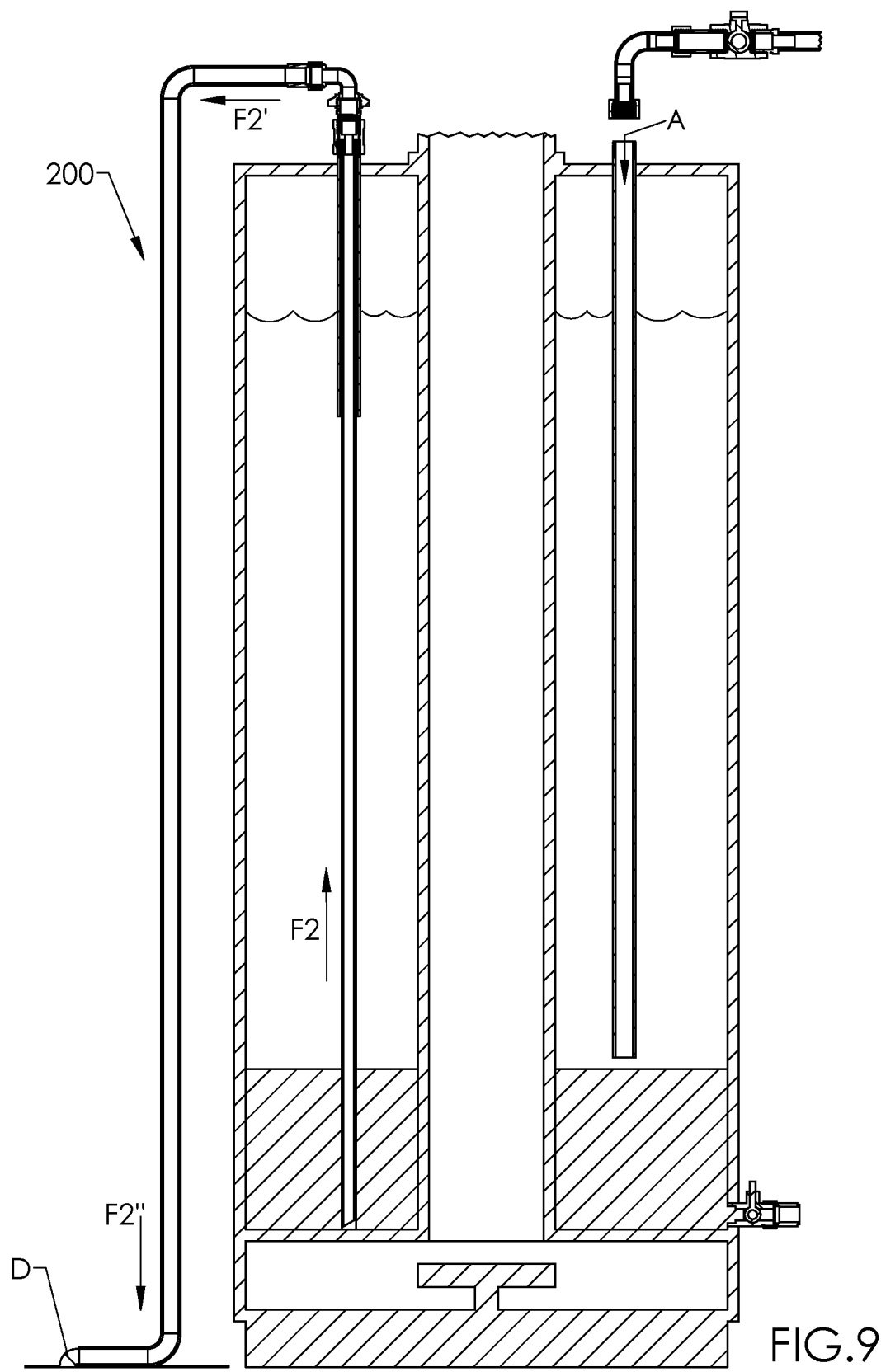
FIG. 9 is a schematic side cross-sectional view of the hot water heater with the tool primed according to the method step of FIG. 7, and with the closed cold water supply line being removed from the tank to vent the tank, for continued sediment and water flow up and out through the tool to the drain/drain-container.
Figure 10:
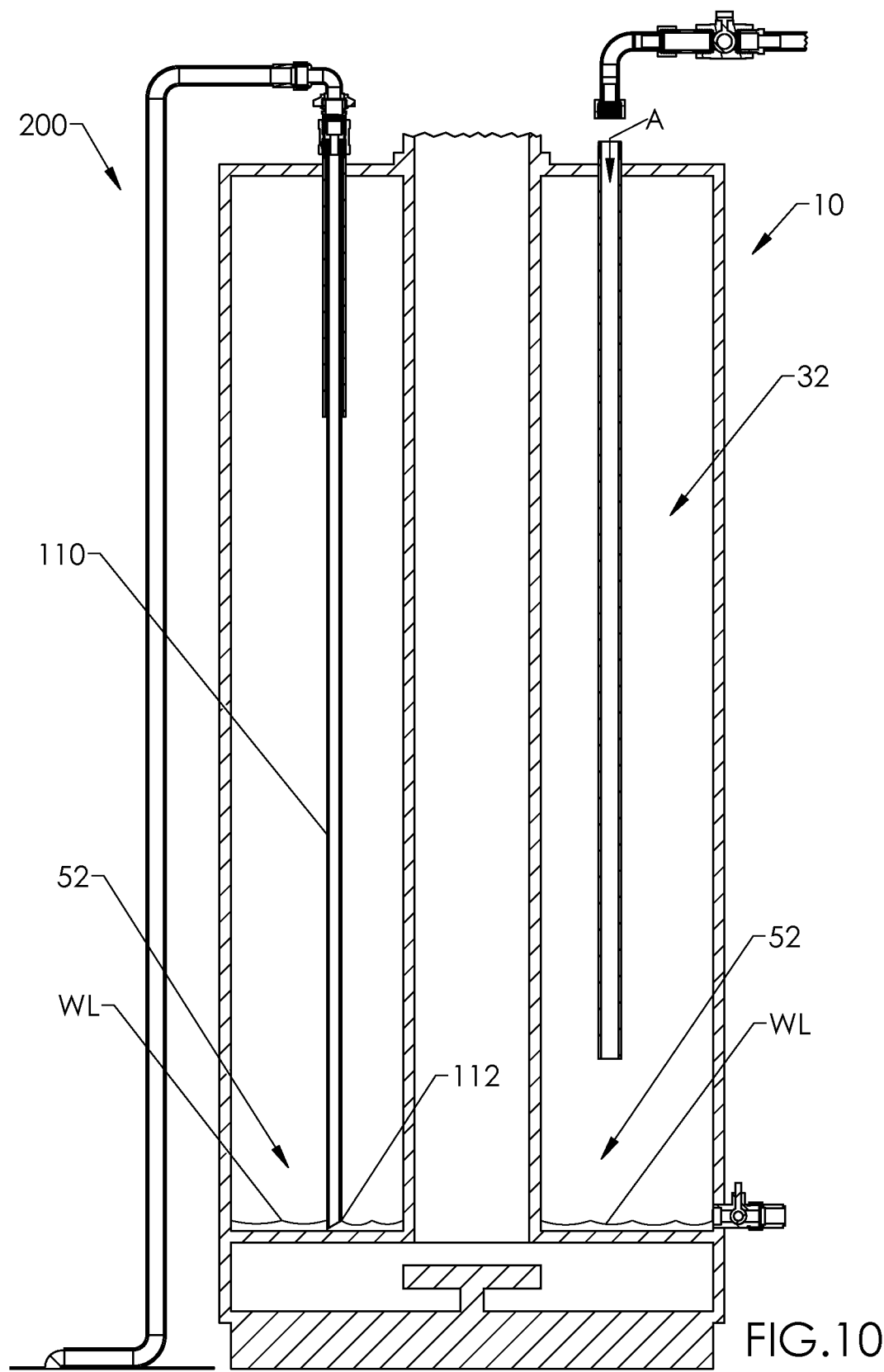
FIG. 10 is a schematic side cross-sectional view of the hot water heater of FIG. 9, with the closed cold water line still removed from the tank, and with sediment and water flow up and out through the tool having continued to the point where the tank is emptied or nearly emptied of both sediment and water.

FIGS. 9 and 10 show further steps that are taken in certain embodiments to completely or substantially clean and empty the tank 10. These steps comprise venting the tank interior space 32, without any water flow into the tank, so that syphoning of the sediment and water through the tool 200 and out of the tank proceeds. FIG. 9 illustrates the removal of the closed cold water inlet 20 to vent the tank to the atmosphere, this vent 20 being conveniently opened with a conventional tool and being at the highest point possible on the tank to ensure that air enters the tank and liquid does not leak or flow out through the vent. While FIG. 9 shows removal of the cold water inlet 20 from the cold water port 28, alternative methods may use the cold water port as the vent, for example, loosening the connection of the cold water inlet 20 to the port 28 to an extent that air easily enters the interior space of the tank; therefore, the terms "disconnect the cold water inlet" or "when the cold water inlet is disconnected" includes removal of the inlet from the port and/or loosening the connection of the inlet to the port. Upon this venting, the vacuum is "broken" by the air A coming into the tank 12 through the cold water port 28, and flow (F2, F2', F2") of water and sediment resume, with the out-going liquid being replaced by the incoming air. In another words, water and sediment continue to flow (F2, F2', F2") from the tank to the lower drain/drain-container D at the floor/ground G, because air A can take the place of the water and sediment in the tank 10. The flow of water and sediment through the tool 200 continues as long as there is water and/or sediment above the level of the topmost edge of the slanted bottom tip 112 of the dip-tube 110, and as long as the bottom end of the hose 160 is below the level of the tip 112, that is, preferably at least several inches, and more preferably 10-18 inches, below the tip 112 to maintain the flow in spite of some pressure drop through the tool 200.

FIG. 10 illustrates the result of this continued flow/syphoning of water and sediment, which is that the tank is completely or nearly completely empty of water and of sediment. There is a small layer WL of water/sediment left on the bottom surface 55 of the tank 10, for example, equal to the amount of water/sediment present on the surface 55 when the bottom tip 112 of the tube 110 is no longer entirely under water/liquid. This is typically less than an inch, for example half an inch, of water/sediment, which is a very small percentage of the original sediment 50, for example, less than 5% of the sediment, and a very small fraction of the original water in the tank, for example, less than 3% of the water. For example, in certain embodiments, only about 1-2 gallons of water, mixed with some sediment, remains in the tank when the flow of liquid out of the tank through the tool stops due to remaining water/sediment being below the top end of the slanted opening of the dip-tube, and this may be described as "emptying the tank". Therefore, the tool 200 and methods have cleaned and emptied the hot water tank, quickly and effectively, without moving or removing the tool in any of the steps shown in FIGS. 7-10, without electric or hand-operated pumps, without compressors, without trying to pump or otherwise force water or air into the drain line, without disassembly of the drain line/valve or any other part of the hot water heater except hot and cold water lines, which are outside of the tank (20, 46, 48) and are typically easy to remove, and without a mess, flood or damage to the surrounding floor or other house or commercial space. The tool 200 and methods may be used by plumbers, homeowners, or maintenance personnel due to the ease, safety, and cleanliness of the process.

After the cleaning and draining of the hot water heater as described herein, the tool may be removed from the tank, and the tank may be removed and replaced, or, in certain embodiments, put back in service by reconnecting the hot and cold water lines and proceeding with safe start-up of the fuel and operation of the water heater according to conventional methods.

In certain embodiments, the tool's fitting system 102 may comprise, consist essentially of, or consist of metal components such as described above and portrayed in the drawings, for example brass and galvanized steel, and the tool 200 may comprise, consist essentially of, or consist of the fitting system 102 plus a polymeric/plastic dip-tube 110 and a downspout such as a conventional garden hose. Alternatively, in certain embodiments, the fitting system 102 may be cast, molded or machined from fewer parts, or even a single unit, that perform(s) as described above. For example, in certain embodiments, multiple or all of the adapter 120, coupling 130, connector 140, and garden hose elbow 150 may be made as a single unit, with the dip-tube being connected to the single-unit fitting system, for example, to a longer adapter bottom end that extends down past the bottom of the coupling and so is accessible but does not interfere with connection of the single unit to the hot water port. Alternatively, in certain embodiments, the entire fitting system dip-tube may be cast, molded or machined from various material(s) to be a single unit, for example, including a dip-tube that is the same material as the fitting system. Said single unit(s), in certain embodiments, may be made of various materials if: they can liquid-seal to the hot water port and liquid seal to the garden hose/downspout, are durable, and are rigid or at least sufficiently rigid to prevent bending, crimping, or other disruption of the function and liquid flow functions required for the tool and methods.

Although this disclosed technology has been described above with reference to particular means, materials, and embodiments, it is to be understood that the disclosed technology is not limited to these disclosed particulars but extends instead to all equivalents within the scope of the following claims.

The invention claimed is:

1. A method of cleaning and draining a hot water heater that comprises a tank with an interior space defined at its bottom end by a bottom surface, the tank holding water in the interior space and a sediment bed at the bottom of the interior space, a cold water port adapted to connect to a cold water inlet to deliver cold water into the interior space, a hot water port adapted to connect to a hot water outlet to deliver hot water out from the interior space to a user, and a heat source for heating the water in the interior space;

wherein the method comprises providing a tool comprising:
a dip-tube that is installed in the tank, when the hot water outlet is disconnected from the hot water port, by being inserted through the hot water port to extend down through the interior space to within one inch of the bottom surface;
a fitting system connected to the hot water port and connecting the dip-tube to a hose;

wherein the hose extends from the fitting system along an outer side of the tank, and a bottom end of the hose is placed at a bottom end level outside the hot water heater that is lower than said bottom surface; and the method further comprising:

adding cold water to the tank through the cold water inlet to pressurize the tank, wherein pressurizing the tank primes the tool by the forcing water and sediment to flow up the dip-tube, through the fitting system, through the garden hose to the bottom end level for draining to a drain or container; and closing and disconnecting the cold water inlet from the cold water port to vent the tank to the atmosphere, whereby water and sediment continue flowing, by siphon action, up the dip-tube, through the fitting system, through the garden hose to the bottom end level for draining to a drain or container, to drain and clean the tank.

2. The method as in claim 1, wherein the dip-tube is polymeric and is cut, prior to being installed in the tank, to fit the length of the tank so that, when installed, a top end of the dip-tube is inside the hot water port and a bottom end of the dip-tube touches said bottom surface.

3. The method as in claim 2, wherein the dip-tube bottom end has a slanted bottom opening that extends from a bottom tip of the bottom end to a top edge of the bottom opening that is higher than the bottom tip, so that, when the dip-tube is installed in the tank, the bottom tip touches the bottom surface.

4. The method as in claim 1, the fitting system comprises an adapter attached to the dip-tube, a connector that connects a top end of the adapter to an elbow that has an elbow top end that is a hose connection for connecting to the hose, and a coupling having a top end that attaches to the connector and a bottom end that extends down from the connector and attaches to the hot water port.

5. The method as in claim 1, wherein the tank comprises a drain line that is plugged by a portion of the bed of sediment, and the method does not include unplugging the drain line.

6. The method as in claim 5, wherein the method does not include disassembling the drain line.

7. The method as in claim 1 that does not include using an electric or hand-operated pump to pump water or sediment out of the tank.

8. A method for draining a water heater, the heater having a top side, a bottom side, and an outer side extending between the top side and bottom side, the heater having an interior space with a bottom for holding water, a cold water inlet, a hot water outlet, and a heat source for the interior space, the method comprising:

inserting and connecting a dip-tube through the hot water outlet, the dip-tube having a top end and a bottom end, so that the dip-tube's bottom end extends downwardly to near the bottom of the heater interior space so that the dip-tube's bottom end is in fluid communication with the water in the heater interior space;

providing a downspout having a top end and a bottom end, and connecting the downspout top end to the dip-tube top end with a siphon fitting system, so that the downspout is also in fluid communication, through the siphon fitting system and the dip-tube, with the water in the heater interior space;

extending the downspout bottom end away from the siphon fitting system and over the top side of the heater and down along the outer side of the heater, so that the downspout bottom end is lower than the bottom end of the heater interior space;

flowing cold water through the cold water inlet into the heater interior space, so that water in the heater interior space flows up through the dip-tube, through the siphon fitting system, and out through the downspout;

stopping the flow of cold water into the heater interior space; and venting the heater interior space to the atmosphere so that the water continues to flow by siphoning, until the water stops draining from the bottom end of the downspout.

9. The method as in claim 8, wherein the siphon fitting system is air-sealed and liquid-sealed to the hot water port.

10. The method as in claim 9, wherein the dip-tube is polymeric and is cut, prior to inserting and connecting the dip-tube through the hot water outlet, to fit the length of the heater interior space, so that the top end of the dip-tube is inside the hot water port and the bottom end of the dip-tube is at a location selected from the group consisting of: within ½ inch of the bottom of the interior space, within ¼ inch of the bottom of the interior space, and touching the bottom of the interior space.

11. The method as in claim 10, wherein the heater further contains a sediment bed settled at the bottom of the interior space, the dip-tube bottom end has a slanted bottom opening that extends from a bottom tip of the dip-tube to a top edge of the slanted bottom opening that is higher than the bottom tip, and sediment flows, with the water, by siphoning through the slanted bottom opening, through the dip-tube, through the siphon fitting system, and out through the downspout.

12. The method as in claim 8, wherein the siphon fitting system comprises an adapter attached to the dip-tube, a connector that connects a top end of the adapter to an elbow that has an elbow top end that is a garden hose connection, and a coupling that air-seals and liquid-seals the siphon fitting system to the hot water port; and the downspout comprises a garden hose connected at the elbow top end.

\* \* \* \* \*